(12) United States Patent
Saitoh

(10) Patent No.: US 10,609,509 B2
(45) Date of Patent: Mar. 31, 2020

(54) INFORMATION PROCESSING SYSTEM, INFORMATION PROCESSING APPARATUS, AND INFORMATION PROCESSING METHOD FOR PROVIDING APPLICATION INFORMATION

(71) Applicant: Atsuhisa Saitoh, Kanagawa (JP)

(72) Inventor: Atsuhisa Saitoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 68 days.

(21) Appl. No.: 15/488,859

(22) Filed: Apr. 17, 2017

(65) Prior Publication Data

US 2017/0223500 A1     Aug. 3, 2017

Related U.S. Application Data

(63) Continuation of application No. 14/958,040, filed on Dec. 3, 2015, now Pat. No. 9,661,171.

(30) Foreign Application Priority Data

Dec. 9, 2014  (JP) .................................. 2014-249140
Nov. 25, 2015 (JP) .................................. 2015-229678

(51) Int. Cl.
*H04N 1/00* (2006.01)
*H04W 4/021* (2018.01)
(Continued)

(52) U.S. Cl.
CPC .......... *H04W 4/021* (2013.01); *G06F 21/123* (2013.01); *G06F 21/51* (2013.01); *H04L 63/107* (2013.01);
(Continued)

(58) Field of Classification Search
None
See application file for complete search history.

(56) References Cited

U.S. PATENT DOCUMENTS 7,117,493 B2 * 10/2006 Matsushima ........... G06F 21/51
717/173
7,460,253 B2 * 12/2008 Osada ................ H04N 1/00973
358/1.13
(Continued)

FOREIGN PATENT DOCUMENTS

JP    2010-182309 A    8/2010
JP    2016-081485 A    5/2016
(Continued)

*Primary Examiner* — Paul F Payer
(74) *Attorney, Agent, or Firm* — Harness, Dickey & Pierce, P.L.C.

(57) ABSTRACT

An information processing apparatus connectable to a device includes: an acquiring unit to acquire, from the device, a display request including destination information indicating a country or an area where the device is used and indicating information for requesting an application list screen for providing an application; a specifying unit to specify, based on application compatibility information in which application identification information identifying an application available for the device is associated with the destination information, the application identification information associated with the destination information included in the display request; and a first transmitting unit to transmit, to the device, the application list screen for providing the application identified by the application identification information. The device includes: a second transmitting unit to transmit the display request to the apparatus; a receiving unit to receive the application list screen from the apparatus; and a display controller to display the application list screen.

17 Claims, 12 Drawing Sheets

| GROUP IDENTIFICATION INFORMATION | TYPE INFORMATION | DEVICE SPECIFYING INFORMATION |
|---|---|---|
| MP C high | MP C SERIES HIGH-SPEED TYPE | ABCD ABEF |
| MP C low | MP C SERIES LOW-SPEED TYPE | ABGH |
| MP high | MP SERIES HIGH-SPEED TYPE | EFGH EFIJ |
| MP low | MP SERIES LOW-SPEED TYPE | IJKL IJMN |
| MP C 03 | MP C SERIES 03 GENERATION | ABCD |
| MP 03 | MP SERIES 03 GENERATION | EFGH IJKL |
| ... | ... | ... |

(51) Int. Cl.
  *G06F 21/12* (2013.01)
  *G06F 21/51* (2013.01)
  *H04L 29/06* (2006.01)
  *H04W 4/02* (2018.01)
  *H04W 12/08* (2009.01)

(52) U.S. Cl.
  CPC ....... *H04N 1/0097* (2013.01); *H04N 1/00498* (2013.01); *H04N 1/00509* (2013.01); *H04N 1/00938* (2013.01); *H04W 4/025* (2013.01); *H04W 12/08* (2013.01)

(56) References Cited

U.S. PATENT DOCUMENTS

| | | | | |
|---|---|---|---|---|
| 7,554,685 | B2* | 6/2009 | Akiyoshi | G06F 8/41 358/1.15 |
| 8,195,969 | B2* | 6/2012 | Katoh | G06F 15/177 713/1 |
| 8,630,009 | B2* | 1/2014 | Kamath | 358/1.15 |
| 8,650,561 | B2* | 2/2014 | Gharabally | G06F 9/453 717/178 |
| 8,745,153 | B2* | 6/2014 | Gharabally | G06F 8/61 709/217 |
| 8,887,054 | B2 | 11/2014 | Chapple et al. | |
| 2010/0205274 | A1 | 8/2010 | Gharabally et al. | |
| 2014/0280462 | A1 | 9/2014 | Gharabally et al. | |
| 2014/0351322 | A1 | 11/2014 | Mun et al. | |
| 2015/0029535 | A1* | 1/2015 | Kondoh | G06F 21/608 358/1.14 |
| 2015/0281501 | A1 | 10/2015 | Araki et al. | |
| 2016/0149885 | A1 | 5/2016 | Negoro | |

FOREIGN PATENT DOCUMENTS

| | | |
|---|---|---|
| JP | 2016-085659 A | 5/2016 |
| JP | 2016105266 A | 6/2016 |
| JP | 2016105579 A | 6/2016 |

* cited by examiner

FIG.8

| APPLICATION IDENTIFICATION INFORMATION | APPLICATION NAME | CONTENT DESCRIPTION INFORMATION | INFORMATION ON TERMS OF USE | DEVICE INFORMATION | | |
|---|---|---|---|---|---|---|
| | | | | DEVICE SPECIFYING INFORMATION | LANGUAGE INFORMATION | DESTINATION INFORMATION |
| 001 | APPLICATION 1 | ⋮ | ⋮ | ABCD ABEF ABGH EFGH EFIJ IJKL IJMN | JP EN FR DE | JP NA EU |
| 002 | APPLICATION 2 | ⋮ | ⋮ | ABCD ABEF ABGH | CN KR | CN KR |
| 003 | APPLICATION 3 | ⋮ | ⋮ | ABCD EFGH IJKL | JP | JP |
| ⋮ | ⋮ | ⋮ | ⋮ | ⋮ | ⋮ | ⋮ |

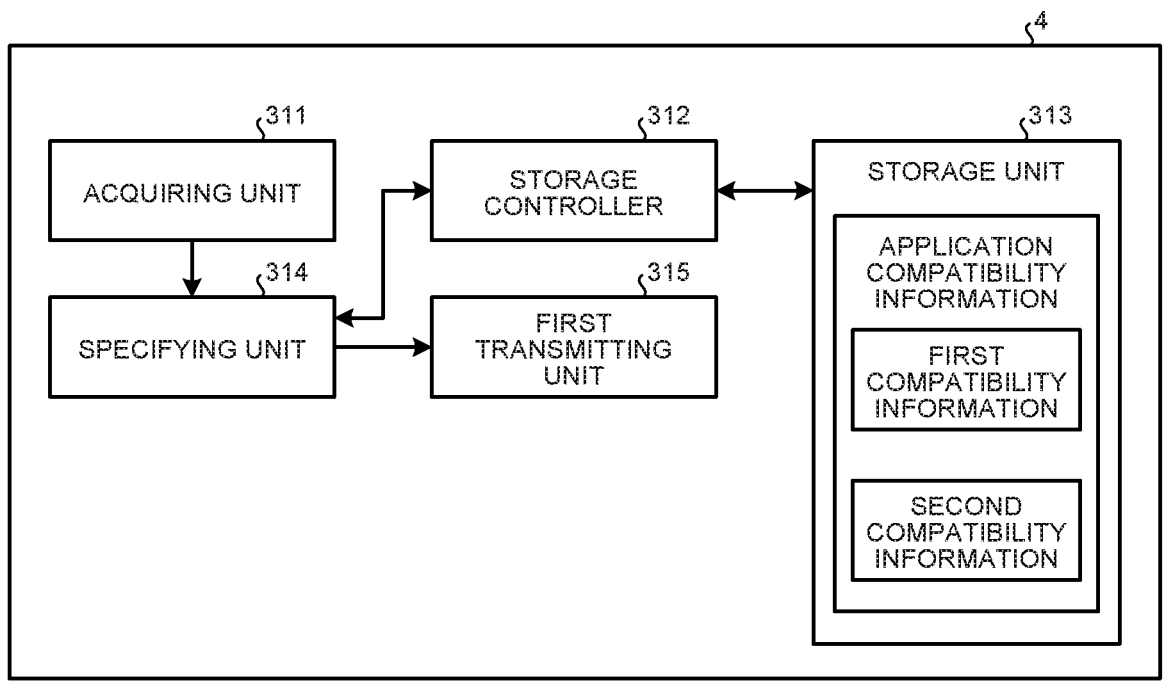

FIG.13

| APPLICATION IDENTIFICATION INFORMATION | APPLICATION NAME | CONTENT DESCRIPTION INFORMATION | INFORMATION ON TERMS OF USE | GROUP IDENTIFICATION INFORMATION | LANGUAGE INFORMATION | DESTINATION INFORMATION |
|---|---|---|---|---|---|---|
| 001 | APPLICATION 1 | ⋮ | ⋮ | MP C high<br>MP C low<br>MP high<br>MP low | JP<br>EN<br>FR<br>DE | JP<br>NA<br>EU |
| 002 | APPLICATION 2 | ⋮ | ⋮ | MP C high<br>MP C low | CN<br>KR | CN<br>KR |
| 003 | APPLICATION 3 | ⋮ | ⋮ | MP C 03<br>MP 03 | JP | JP |
| ⋮ | ⋮ | ⋮ | ⋮ | ⋮ | ⋮ | ⋮ |

INFORMATION PROCESSING SYSTEM, INFORMATION PROCESSING APPARATUS, AND INFORMATION PROCESSING METHOD FOR PROVIDING APPLICATION INFORMATION

CROSS-REFERENCE TO RELATED APPLICATIONS

This application is a continuation of U.S. application Ser. No. 14/958,040, filed on Dec. 3, 2015, which claims priority to and incorporates by reference the entire contents of Japanese Patent Application No. 2014-249140 filed in Japan on Dec. 9, 2014 and Japanese Patent Application No. 2015-229678 filed in Japan on Nov. 25, 2015.

BACKGROUND OF THE INVENTION

1. Field of the Invention

The present invention relates to an information processing system, an information processing apparatus, and an information processing method.

2. Description of the Related Art

Recently, the spread of various kinds of communication devices represented by mobile phones and information mobile terminals has promoted the development of applications available on the communication devices. For example, Japanese Laid-open Patent Publication No. 2010-182309 discloses a technique for providing applications on a server and downloading any provided application by selecting the application with a communication device (computing device).

However, the technique disclosed in Japanese Laid-open Patent Publication No. 2010-182309 does not determine whether the selected application is available for the computing device in consideration of countries or areas (destination places) where the computing device is used. In some destination places of computing devices, the problem that a downloaded and installed application is found to be unavailable due to function restrictions by countries or areas may occur. Thus, it has not been possible to provide applications according to function restrictions by countries or areas.

SUMMARY OF THE INVENTION

It is an object of the present invention to at least partially solve the problems in the conventional technology.

According to an embodiment, an information processing system includes one or more devices and an information processing apparatus connectable to the device through a network. The information processing apparatus includes an acquiring unit, a specifying unit, and a first transmitting unit. The acquiring unit acquires, from the device, a display request that includes destination information indicating a country or an area where the device is used, and indicates information for requesting an application list screen for providing an application. The specifying unit specifies, based on application compatibility information in which application identification information for identifying an application available for the device is associated with each piece of the destination information, the application identification information that is associated with the destination information included in the display request acquired by the acquiring unit. The first transmitting unit transmits, to the device, the application list screen for providing the application that is identified by the application identification information specified by the specifying unit as a response to the display request acquired by the acquiring unit. The device includes a second transmitting unit, a receiving unit, and a display controller. The second transmitting unit transmits the display request to the information processing apparatus. The receiving unit receives the application list screen from the information processing apparatus as a response to the display request. The display controller performs control of displaying the application list screen received by the receiving unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram illustrating an example of application compatibility information;

FIG. 11 is a diagram illustrating an example of a function configuration of a server according to a modification;

FIG. 12 is a diagram illustrating an example of first compatibility information;

FIG. 13 is a diagram illustrating an example of second compatibility information;

DETAILED DESCRIPTION OF THE PREFERRED EMBODIMENT

An embodiment of an information processing system, an information processing apparatus, an information processing method, and a computer program according to the present invention will be described below in detail with reference to the accompanying drawings. The following describes a multifunction peripheral (MFP) that is an embodiment of an image forming apparatus as an example of a device according to the present invention, but this is not limiting. The MFP is an apparatus having a plurality of different functions such as a copy function, a scanner function, a printer function, and a facsimile function.

Figure 1:
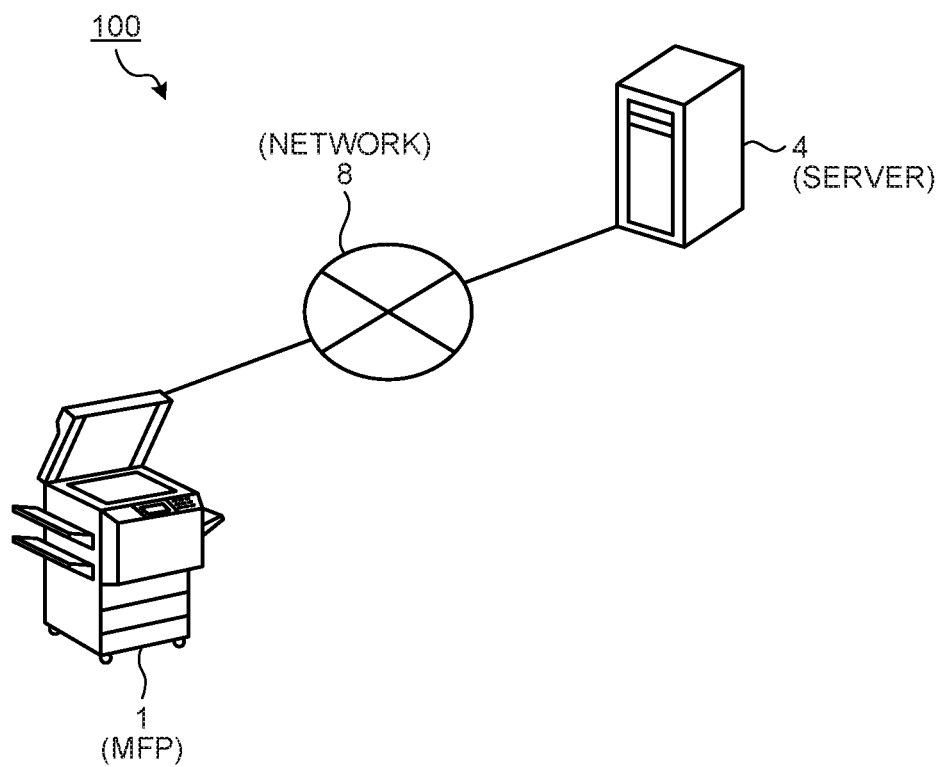
FIG. 1 is a diagram illustrating an example of a schematic configuration of an information processing system.

FIG. 1 is a diagram illustrating an example of a schematic configuration of an information processing system 100 according to the present embodiment. As illustrated in FIG.

1, the information processing system 100 includes an MFP 1 and a server 4, and the MFP 1 and the server 4 are connected to one another through a network 8.

The server 4 is an example of the "information processing apparatus", and has a function (first transmitting unit) of transmitting (providing), for each application available for the MFP 1, a Web page that presents terms of use of the application and is used for downloading the application, in other words, a Web page (hereinafter referred to as an "application list screen 6") for providing an application available for the MFP 1 to the MFP 1. More specific contents will be described later. In this example, an application for acquiring the application list screen 6 from the server 4 and displaying the acquired application list screen 6 on the MFP 1 (hereinafter may be referred to as an "application market application 3") is preinstalled on the MFP 1. In this example, functions of the application market application 3 are implemented by use of an application (hereinafter may be referred to as a "browser application 2b") for providing a Web browser function. In this example, the browser application 2b is also preinstalled on the MFP 1. Specific contents of the MFP 1 will be described later.

FIG. 1 exemplifies only one MFP 1 as the device included in the information processing system 100 for convenience of explanation, but this is not limiting. The number of and kinds of devices included in the information processing system 100 are arbitrary.

Figure 2:
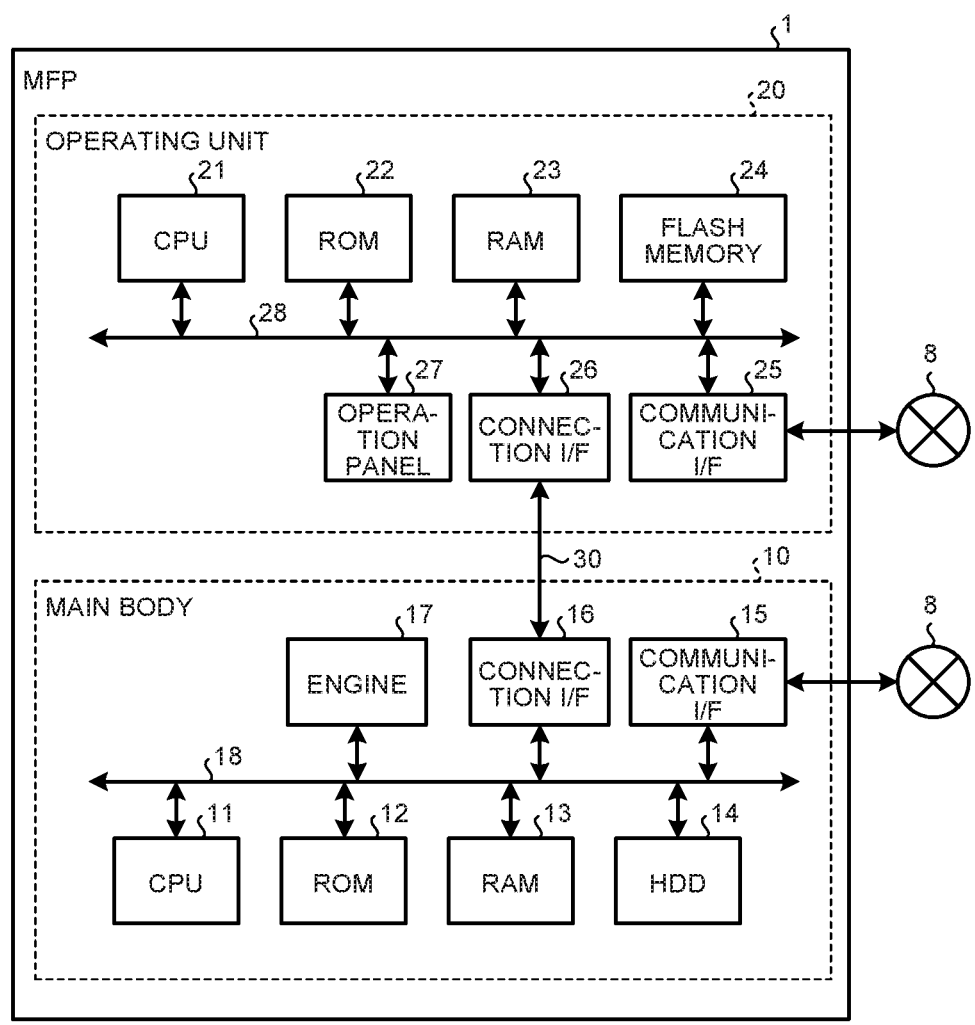
FIG. 2 is a diagram illustrating an example of a hardware configuration of a multifunction peripheral (MFP)

The following describes a hardware configuration of the MFP 1 with reference to FIG. 2. As illustrated in FIG. 2, the MFP 1 includes a main body 10 that can implement various kinds of functions such as a copy function, a scanner function, a facsimile function, and a printer function, and an operating unit 20 that receives operations made by a user. The concept of receiving operations made by a user includes receiving information (including a signal indicating a coordinate value of a screen, and the like) that is input in response to operations made by a user. The main body 10 and the operating unit 20 are communicably connected to one another through a dedicated communication path 30. For example, a communication path conforming to a universal serial bus (USB) standard can be used as the communication path 30, but, regardless wired or wireless, a communication path conforming to any standard may be used.

The main body 10 can operate correspondingly to operations received by the operating unit 20. In addition, the main body 10 can communicate with external apparatuses such as a client personal computer (PC), and can operate correspondingly to an instruction received from the external apparatuses.

The following describes a hardware configuration of the main body 10. As illustrated in FIG. 2, the main body 10 includes a central processing unit (CPU) 11, a read only memory (ROM) 12, a random access memory (RAM) 13, a hard disk drive (HDD) 14, a communication interface (I/F) 15, a connection I/F 16, and an engine 17, and these are connected to one another through a system bus 18.

The CPU 11 integrally controls the operation of the main body 10. The CPU 11 executes a computer program stored in the ROM 12, the HDD 14, or the like using the RAM 13 as a work area (task area) so as to control the operation of the whole main body 10 and implement various kinds of functions such as the copy function, the scanner function, the facsimile function, and the printer function.

The communication I/F 15 is an interface for connecting to the network 8. The connection I/F 16 is an interface for communicating with the operating unit 20 through the communication path 30.

The engine 17 is hardware that performs general-purpose information processing and processing other than communication for implementing the copy function, the scanner function, the facsimile function, and the printer function. The engine 17 includes, for example, a scanner (image reading unit) that scans and reads an image of a document, a plotter (image forming unit) that performs printing on a sheet member such as sheets of paper, and a facsimile that performs facsimile communication. The engine 17 can also include specific options such as a finisher that sorts a printed sheet member and an auto document feeder (ADF) that automatically feeds a document.

The following describes a hardware configuration of the operating unit 20. As illustrated in FIG. 2, the operating unit 20 includes a CPU 21, a ROM 22, a RAM 23, a flash memory 24, a communication I/F 25, a connection I/F 26, and an operation panel 27, and these are connected to one another through a system bus 28.

The CPU 21 integrally controls the operation of the operating unit 20. The CPU 21 executes a computer program stored in the ROM 22, the flash memory 24, or the like using the RAM 23 as a work area (task area) so as to control the operation of the whole operating unit 20 and implement various kinds of functions, which will be described later, such as display of information (image) corresponding to input received from a user.

The communication I/F 25 is an interface for connecting to the network 8. The connection I/F 26 is an interface for communicating with the main body 10 through the communication path 30.

The operation panel 27 receives various kinds of input corresponding to operations made by a user, and displays various kinds of information (for example, information corresponding to received operations, information indicating an operation situation of the MFP 1, and information indicating a setting state). In this example, the operation panel 27 is formed of a liquid crystal display (LCD) apparatus with a touch panel function, but this is not limiting. The operation panel 27 may be formed of, for example, an organic electroluminescence (EL) display apparatus with a touch panel function. The operation panel 27 may be provided with an operating unit such as hardware keys and a display unit such as a lamp in addition to or in place of the LCD apparatus.

Figure 3:
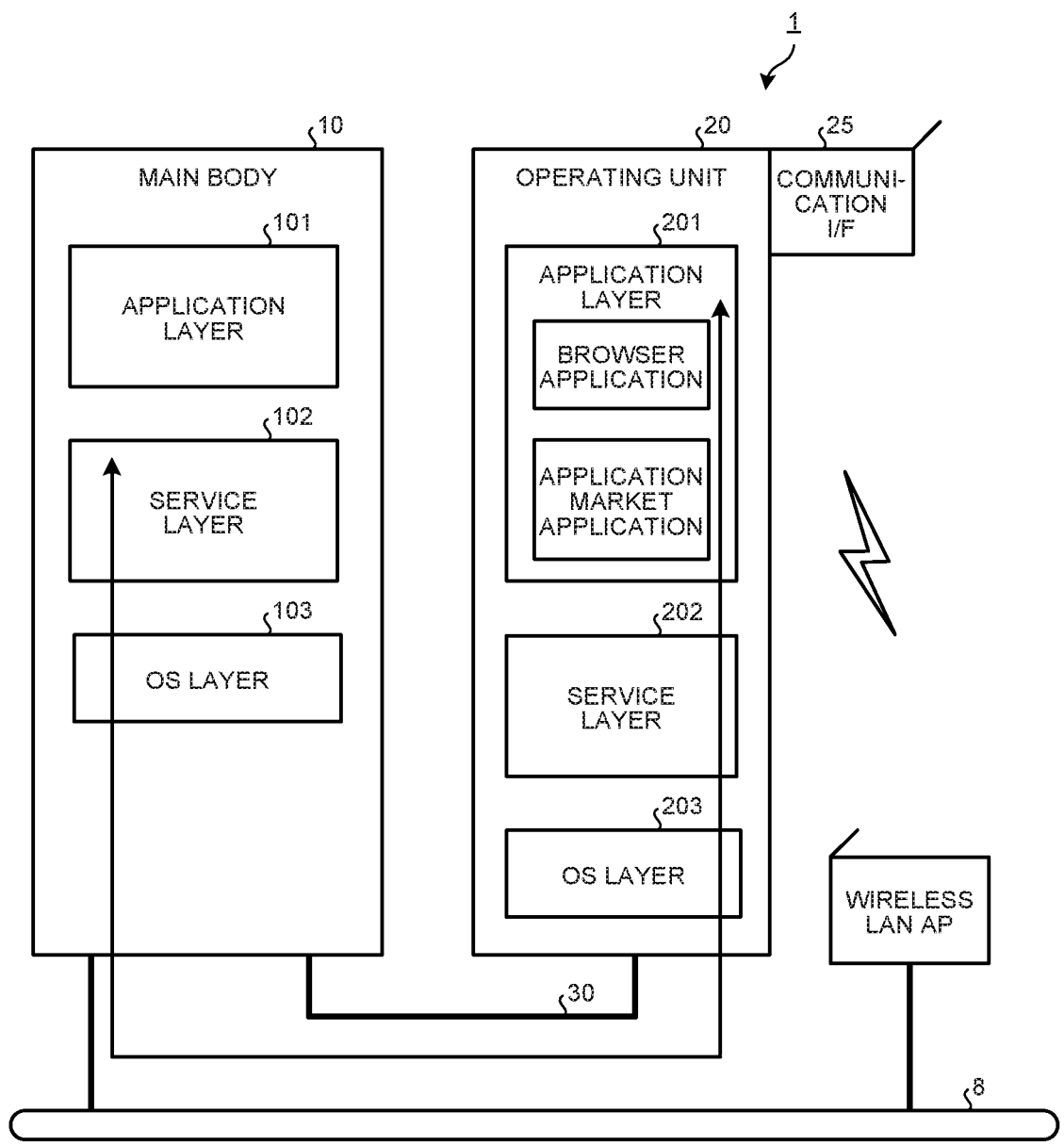
FIG. 3 is a diagram illustrating an example of a software configuration of the MFP.

The following describes a software configuration of the MFP 1. FIG. 3 is a schematic diagram illustrating an example of a software configuration of the MFP 1. As illustrated in FIG. 3, the main body 10 includes an application layer 101, a service layer 102, and an operating system (OS) layer 103. Entities of the application layer 101, the service layer 102, and the OS layer 103 are various kinds of software stored in the ROM 12, the HDD 14, and the like. The CPU 11 executes the software so as to provide various kinds of functions.

Software of the application layer 101 is application software (hereinafter may be simply referred to as an "application") for operating a hardware resource and providing a certain function. Examples of the application include a copy application for providing a copy function, a scanner application for providing a scanner function, a facsimile application for providing a facsimile function, and a printer application for providing a printer function.

Software of the service layer 102 is interposed between the application layer 101 and the OS layer 103, and is software for providing an interface for using hardware resources included in the main body 10 to the application. More specifically, the software of the service layer 102 is software for providing functions of receiving operation requests issued to the hardware resources and arbitrating the operation requests. Examples of the operation requests received by the service layer 102 may include requests for scanner reading, plotter printing, and the like.

An interface function of the service layer 102 is provided to an application layer 201 of the operating unit 20 as well as the application layer 101 of the main body 10. In other words, the application layer 201 (application) of the operating unit 20 can also implement a function obtained by using the hardware resources (for example, the engine 17) of the main body 10 through the interface function of the service layer 102.

Software of the OS layer 103 is basic software (operating system (OS)) for providing basic functions of controlling hardware included in the main body 10. The software of the service layer 102 converts use requests of hardware resources from various kinds of applications to commands that can be interpreted by the OS layer 103, and transfers the commands to the OS layer 103. The software of the OS layer 103 executes the commands, and the hardware resources operate based on the requests from applications.

Similarly, the operating unit 20 includes the application layer 201, a service layer 202, and an OS layer 203. A hierarchical structure of the application layer 201, the service layer 202, and the OS layer 203 included in the operating unit 20 is the same as that on the main body 10 side. However, functions provided by applications of the application layer 201 and kinds of operation requests that can be received by the service layer 202 are different from those on the main body 10 side. Applications of the application layer 201 may be software for causing hardware resources included in the operating unit 20 to operate and providing a certain function, but the applications of the application layer 201 are software for mainly providing user interface (UI) functions for performing operation and display related to functions (the copy function, the scanner function, the facsimile function, and the printer function) that the main body 10 has. Applications of the application layer 201 include the browser application 2b and the application market application 3.

In the present embodiment, the software of the OS layer 103 on the main body 10 side is different from the software of the OS layer 203 on the operating unit 20 side in order to maintain independency of functions. In other words, the main body 10 and the operating unit 20 operate independently of one another on different OSes. For example, Linux (registered trademark) can be used as the software of the OS layer 103 on the main body 10 side, and Android (registered trademark) can be used as the software of the OS layer 203 on the operating unit 20 side.

Because the main body 10 and the operating unit 20 in the MFP 1 according to the present embodiment operate on different OSes as described above, communication between the main body 10 and the operating unit 20 is performed as not interprocess communication in a common apparatus but communication between different apparatuses. Examples of this communication include operation (command communication) that the operating unit 20 transmits received information (instruction contents from a user) to the main body 10 and operation that the main body 10 notifies the operating unit 20 of events. The operating unit 20 performs command communication to the main body 10 so as to use functions of the main body 10. Examples of the events notified from the main body 10 to the operating unit 20 include an execution situation of operation in the main body 10 and contents defined by the main body 10 side.

In the present embodiment, power is supplied from the main body 10 to the operating unit 20 through the communication path 30, and power supply control of the operating unit 20 can be performed separately from (independently of) power supply control of the main body 10.

Figure 4:
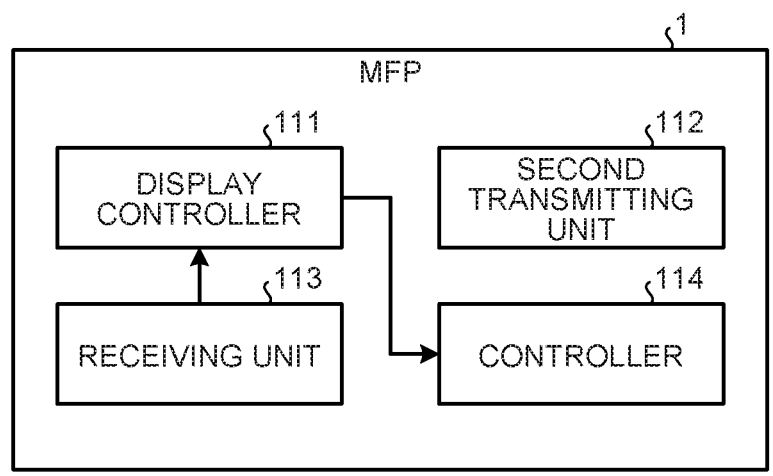
FIG. 4 is a block diagram illustrating an example of a function configuration of the MFP.

The following describes a function configuration of the MFP 1. FIG. 4 is a block diagram illustrating an example of the function configuration of the MFP 1. As illustrated in FIG. 4, the MFP 1 includes a display controller 111, a second transmitting unit 112, a receiving unit 113, and a controller 114. FIG. 4 mainly exemplifies functions according to the present invention for convenience of explanation, but the functions that the MFP 1 has are not limited to them.

Figure 5:
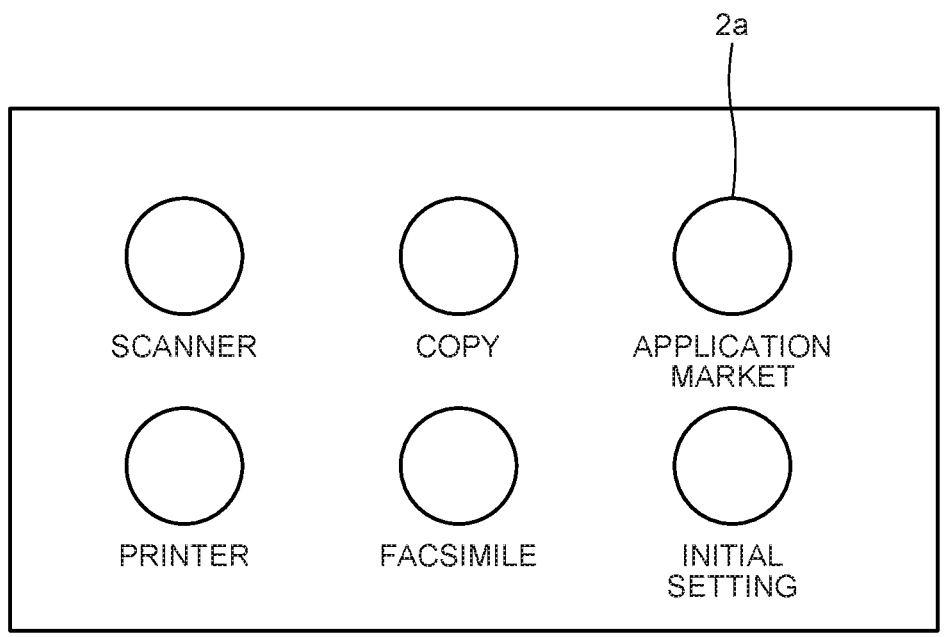
FIG. 5 is a diagram illustrating an example of an operation screen.

The display controller 111 performs control of displaying various kinds of screens on the operation panel 27 (display unit). The display controller 111 according to the present embodiment performs control of displaying on the operation panel 27 an operation screen for performing various kinds of operation. FIG. 5 is a diagram illustrating an example of the operation screen, and an icon 2a for starting the application market application 3 is displayed on the operation screen. The display controller 111 according to the present embodiment also performs control of displaying the application list screen 6 on the operation panel 27.

When a user taps the icon 2a, the application market application 3 starts and the application market application 3 (second transmitting unit 112) requests the application list screen 6 from the server 4. The second transmitting unit 112 transmits, to the server 4, a display request that includes destination information indicating countries or areas (destination places) where the MFP 1 is used, and that indicates information requesting the application list screen 6 for providing applications. Specific contents of the information included in the display request will be described later.

The receiving unit 113 receives the application list screen 6 as a response to a display request from the server 4. The display controller 111 (browser application 2b) performs control of displaying the application list screen 6 received by the receiving unit 113 on the operation panel 27. The controller 114 performs control for using, out of the applications displayed on the application list screen 6, an application selected by a user on the MFP 1 (including control for installing an application). A specific operation example of the MFP 1 will be described later.

Figure 6:
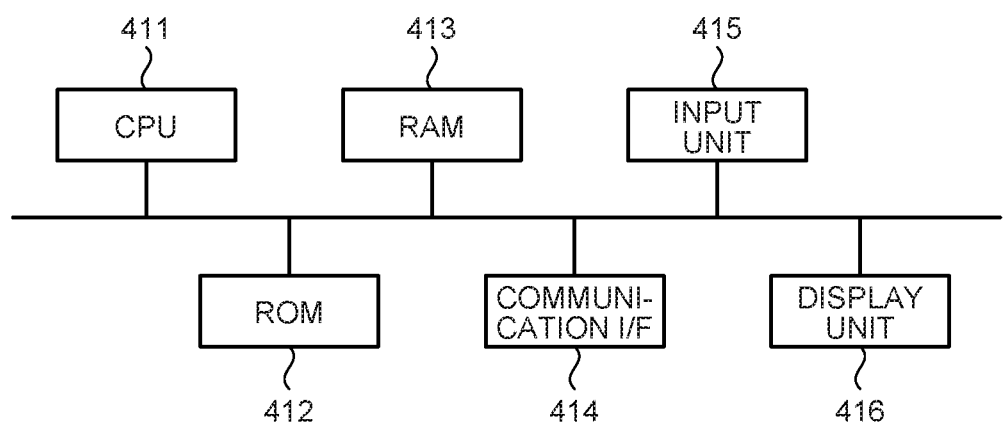
FIG. 6 is a diagram illustrating an example of a hardware configuration of a server.

The following describes a configuration of the server 4. FIG. 6 is a diagram illustrating an example of a hardware configuration of the server 4. As illustrated in FIG. 6, the server 4 includes a CPU 411, a ROM 412, a RAM 413, a communication I/F 414, an input unit 415, and a display unit 416. FIG. 6 exemplifies a minimum configuration in the present embodiment, but the hardware configuration of the server 4 is not limited to this configuration. The CPU 411 integrally controls the operation of the server 4. The ROM 412 is a non-volatile memory that stores therein various kinds of data such as a computer program. The RAM 413 is a volatile memory that functions as a task area (work area) for various kinds of processing executed by the CPU 411. The communication I/F 414 is an interface for communicating with the network 8. The input unit 415 is a device used for operation input by a user, and includes, for example, a mouse and a keyboard. The display unit 416 is a device that displays various kinds of information, and includes, for example, an LCD apparatus.

Figure 7:
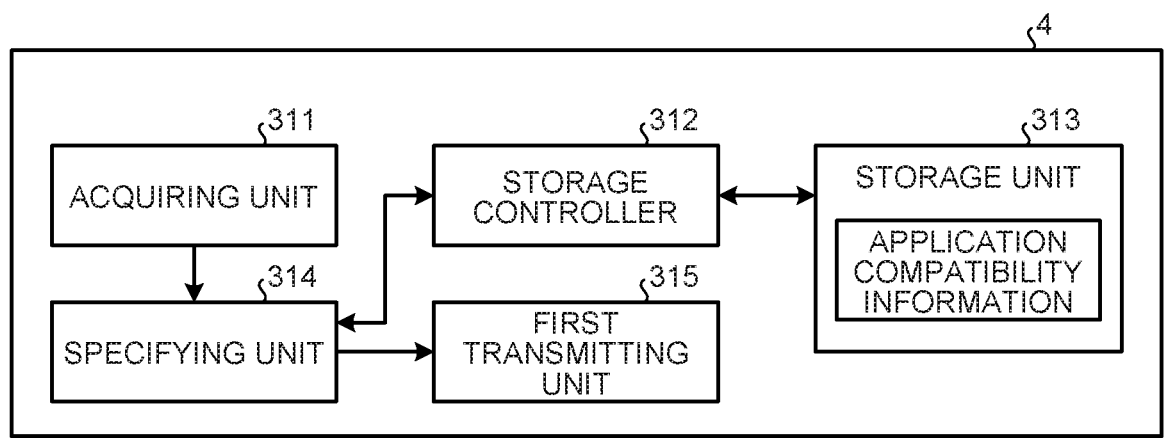
FIG. 7 is a diagram illustrating an example of a function configuration of the server.

FIG. 7 is a diagram illustrating an example of functions that the server 4 has. As illustrated in FIG. 7, the server 4 includes an acquiring unit 311, a storage controller 312, a storage unit 313, a specifying unit 314, and a first transmitting unit 315. FIG. 7 mainly exemplifies functions according to the present invention for convenience of explanation, but the functions that the server 4 has are not limited to them.

The acquiring unit 311 acquires a display request from the MFP 1. Because the display request includes at least destination information in this example as described above, the acquiring unit 311 acquires the display request so as to acquire the destination information included in the acquired display request.

The storage controller 312 controls writing or reading of data to or from the storage unit 313. The storage unit 313 stores therein application compatibility information in which each piece of the destination information is associated with application identification information for identifying applications available for devices such as the MFP 1. FIG. 8 is a diagram illustrating an example of the application compatibility information. In this example, the application compatibility information is information in which each combination of device specifying information and the destination information is associated with the application identification information for identifying applications available for the combination. In the present embodiment, the application compatibility information is information in which each combination of the device specifying information, the destination information, and language information indicating languages displayed on the device specified by the device specifying information is associated with the application identification information for identifying applications available for the combination (which means that the applications do not receive use restrictions due to function restrictions in a destination place that is indicated by the destination information included in the combination). Hereinafter, the combination of the device specifying information, the destination information, and the language information is referred to as "device information". A display request includes the device information. As illustrated in FIG. 8, the application compatibility information according to the present embodiment includes each combination, which is the combination of the device specifying information, the destination information, and the language information (in other words, each piece of device information), associated with the application identification information for identifying applications available for the combination, an application name indicating the name of the application, content description information indicating contents of the application, and information on terms of use that indicates information related to use of the application, but this is not limiting.

Referring back to FIG. 7, the description will be continued. The specifying unit 314 specifies the application identification information that is associated with the destination information included in a display request acquired by the acquiring unit 311 based on the application compatibility information. In the present embodiment, when the acquiring unit 311 acquires (receives) a display request from the MFP 1, the specifying unit 314 specifies the application identification information that is associated with the combination of the device specifying information and the destination information included in the acquired display request based on the application compatibility information. More specifically, the specifying unit 314 specifies the application identification information that is associated with the combination (device information) of the device specifying information, the destination information, and the language information included in the display request acquired by the acquiring unit 311 based on the application compatibility information.

For example, it is assumed that the application compatibility information illustrated in FIG. 8 is preliminary stored in the storage unit 313, and the device information included in a display request from the MFP 1 is formed of the device specifying information indicating "IJKL", the destination information indicating "JP", and the language information indicating "JP". In this case, the specifying unit 314 can specify the application identification information indicating "001" and the application identification information indicating "003" as the application identification information that is associated with the device information included in a display request from the MFP 1 acquired by the acquiring unit 311 (see FIG. 8).

The description of FIG. 7 will be continued. The first transmitting unit 315 transmits, to the device, the application list screen 6 for providing applications that are identified by the application identification information specified by the specifying unit 314 as a response to a display request acquired by the acquiring unit 311. More specifically, the first transmitting unit 315 transmits the application list screen 6 for providing applications that are identified by the application identification information specified by the specifying unit 314 to the device that is specified by the device specifying information included in a display request acquired by the acquiring unit 311. In the present embodiment, at the time of generating the application list screen 6, the first transmitting unit 315 generates the application list screen 6 so that an application different from the application specified by the specifying unit 314 will not be included in the application list screen 6. In other words, the applications included in the application list screen 6 are only applications specified by the specifying unit 314.

Figure 9:
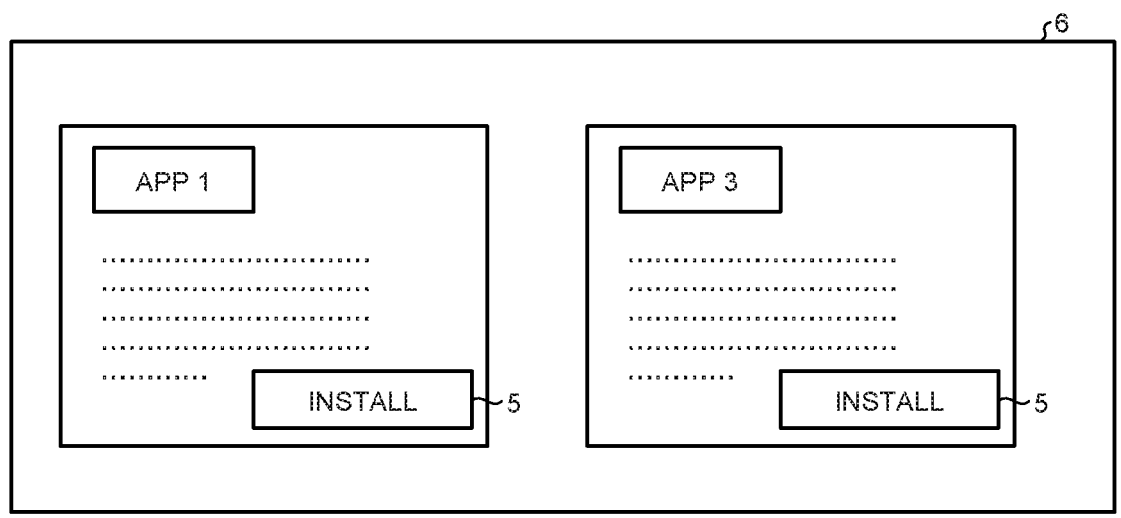
FIG. 9 is a diagram illustrating an example of an application list screen.

For example, as described above, it is assumed that the specifying unit 314 specifies the application identification information indicating "001" and the application identification information indicating "003" as the application identification information that is associated with the device information (in this example, the combination of the device specifying information indicating "IJKL", the destination information indicating "JP", and the language information indicating "JP") included in a display request from the MFP 1 acquired by the acquiring unit 311. In this case, the first transmitting unit 315 generates the application list screen 6 for providing an "application 1" that is identified by the application identification information indicating "001" and an "application 3" that is identified by the application identification information indicating "003" as illustrated in FIG. 9. In this example, the application list screen 6 includes, for each application, description information that describes contents of the application, and a button for instructing the use of the application (in this example, buttons 5, which may be hereinafter referred to as "install buttons 5", for instructing the installation of applications).

Subsequently, the first transmitting unit 315 transmits the generated application list screen 6 to the MFP 1 that is specified by the device specifying information (in this example, the device specifying information indicating "IJKL") included in the device information included in the display request. The MFP 1 (display controller 111) performs control of displaying the application list screen 6 received from the server 4 on the operation panel 27. In the present embodiment, applications displayed on the application list screen 6 are only applications available for the MFP 1, and even when a user taps the install button 5 of any application displayed on the application list screen 6, the request thereof is never rejected. In addition, the problem that a downloaded and installed application is found to be unavailable due to function restrictions by countries or areas never occurs. In this manner, user's convenience can be improved more than before.

The MFP 1 (controller 114) controls, out of the applications displayed on the application list screen 6, an application selected by a user to use the application on the MFP 1. As an example, it is assumed that the application list screen 6 illustrated in FIG. 9 is displayed on the operation panel 27 of the MFP 1, and a user selects the "application 1" (in this example, a user taps the install button 5 illustrated in FIG. 9). In this case, the controller 114 downloads the "application 1" from an application server that stores therein (manages) a plurality of applications including the "application 1", and performs control of installing the "application 1" on the MFP 1. The server 4 may also function as the application server.

For example, an application displayed on the application list screen 6 may be a Web application indicating an application that is used through a network. For example, when the "application 1" selected by a user as described above is a Web application, the controller 114 may execute processing (for example, processing for registering user information that uniquely identifies a user) for using the "application 1", which is a Web application, with the application server without downloading the "application 1" from the application server.

The CPU 411 executes a computer program stored in the ROM 412 and the like so as to implement each function of the acquiring unit 311, the storage controller 312, the specifying unit 314, and the first transmitting unit 315 described above, but this is not limiting. For example, at least a part of the functions of the acquiring unit 311, the storage controller 312, the specifying unit 314, and the first transmitting unit 315 may be implemented by a dedicated hardware circuit (such as a semiconductor integrated circuit). The storage unit 313 according to the present embodiment may be implemented by, for example, the HDD 14 and the like on the main body 10 side or the flash memory 24 and the like on the operating unit 20 side.

For example, functions of each unit in the server 4 may be distributed and installed on a plurality of servers. In short, the information processing system 100 to which the present invention is applied only needs to have at least the function of the acquiring unit 311, the function of the specifying unit 314, and the function of the first transmitting unit 315.

Figure 10:
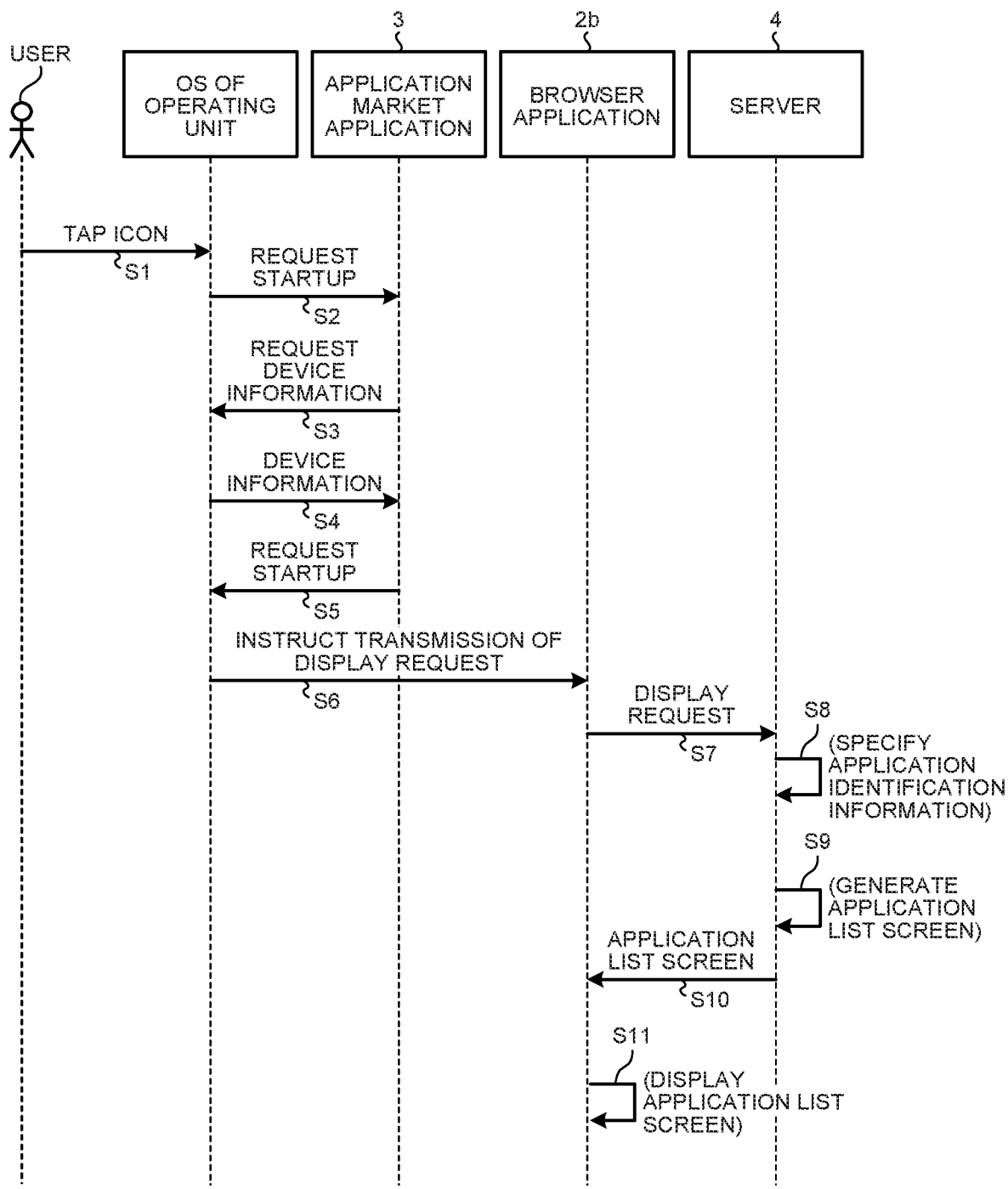
FIG. 10 is a sequence diagram illustrating an example of an operation procedure of the information processing system.

FIG. 10 is a sequence diagram illustrating an example of an operation procedure of the information processing system 100 according to the present embodiment. When a user taps the icon 2a (see FIG. 5) on the operation screen (Step S1), an OS of the operating unit 20 starts the application market application 3 (Step S2). Subsequently, the started application market application 3 requests the device information from the OS of the operating unit 20 (Step S3), and receives the device information from the OS of the operating unit 20 as a response (Step S4). Subsequently, the application market application 3 requests the OS of the operating unit 20 to start the browser application 2b that is preliminarily installed on the MFP 1 (Step S5). The device information and a uniform resource locator (URL) of the server 4 have been added to this request, and the OS of the operating unit 20 having received this request starts the browser application 2b. The OS of the operating unit 20 passes the device information and the URL of the server 4 to the browser application 2b, and instructs the browser application 2b to transmit the display request to the server 4 (Step S6).

The started browser application 2b accesses the URL of the server 4, and transmits the display request (Step S7). The server 4 having received the display request from the MFP 1 specifies the device information included in the display request. The server 4 refers to the application compatibility information stored in the storage unit 313, and specifies the application identification information that is associated with the device information (Step S8). The server 4 generates the application list screen 6 for providing an application that is identified by the application identification information specified at Step S8 (Step S9). Subsequently, the server 4 transmits the generated application list screen 6 as a response to the display request at Step S7 (Step S10). The browser application 2b in the MFP 1 as a request source of the display request performs control of displaying on the operation panel 27 the application list screen 6 received from the server 4 as a response to the display request (Step S11).

As described above, according to the present embodiment, applications that are displayed on the application list screen 6 provided from the server 4 to the MFP 1 are only applications that do not receive use restrictions due to function restrictions in destination places where the MFP 1 is used. Even when a user taps the install button 5 of any application displayed on the application list screen 6, the request thereof is never rejected. In addition, the problem that a downloaded and installed application is found to be unavailable due to function restrictions in a destination place where the MFP 1 is used never occurs. In other words, an application can be provided according to function restrictions in a destination place where the MFP 1 is used so as to improve user's convenience.

First Modification of Embodiment

For example, as illustrated in FIG. 11, the application compatibility information may be formed of first compatibility information in which each piece of group identification information for identifying a group to which one or more devices belong is associated with the device specifying information for specifying a device belonging to a group identified by the group identification information, and second compatibility information in which each combination of the group identification information and the destination information is associated with the application identification information for identifying applications available for the combination.

FIG. 12 is a diagram illustrating an example of the first compatibility information. In the example of FIG. 12, the first compatibility information includes each piece of group identification information, which is information for identifying a group to which one or more devices (in this example, the MFP) belong, associated with the device specifying information for specifying an device belonging to a group identified by the group identification information and type information indicating a type of the group identified by the group identification information, but this is not limiting.

FIG. 13 is a diagram illustrating an example of the second compatibility information. In the example of FIG. 12, the second compatibility information includes each combination, which is the combination of the group identification information, the destination information, and the language information, associated with the application identification information for identifying applications available for the combination, an application name indicating the name of the application, the content description information indicating contents of the application, and the information on terms of use that indicates information related to use of the application, but this is not limiting.

In this example, the specifying unit 314 specifies the group identification information that is associated with the device specifying information included in a display request acquired by the acquiring unit 311 based on the first compatibility information. The specifying unit 314 specifies the application identification information that is associated with the combination of the specified group identification information and the destination information included in the display request acquired by the acquiring unit 311 based on the second compatibility information. The first transmitting unit 315 transmits the application list screen 6 for providing an application that is identified by the application identification information specified by the specifying unit 314 to the device that is specified by the device specifying information included in the display request acquired by the acquiring unit 311.

For example, it is assumed that the first compatibility information illustrated in FIG. 12 and the second compatibility information illustrated in FIG. 13 are preliminarily stored in the storage unit 313, and that the device information corresponding to the MFP 1 is formed of the device specifying information indicating "IJKL", the destination information indicating "JP", and the language information indicating "JP". In this case, the specifying unit 314 specifies the device specifying information (in this example, the device specifying information indicating "IJKL") included in a display request from the MFP 1 acquired by the acquiring unit 311, and acquires the first compatibility information stored in the storage unit 313 through the storage controller 312. The specifying unit 314 refers to the acquired first compatibility information, and specifies the group identification information indicating "MP low" and the group identification information indicating "MP 03" as the group identification information that is associated with the device specifying information indicating "IJKL".

The specifying unit 314 acquires the second compatibility information stored in the storage unit 313 through the storage controller 312, and refers to the acquired second compatibility information so as to specify the application identification information indicating "001" as the application identification information that is associated with the combination of the specified group identification information indicating "MP low", and the destination information and the language information (in this example, the destination information indicating "JP" and the language information indicating "JP") included in a display request from the MFP 1. In addition, the specifying unit 314 refers to the second compatibility information so as to specify the application identification information indicating "003" as the application identification information that is associated with the combination of the specified group identification information indicating "MP 03", and the destination information and the language information (in this example, the destination information indicating "JP" and the language information indicating "JP") included in the display request from the MFP 1. In this example, the first compatibility information and the second compatibility information are stored in a common storage apparatus (in this example, the storage unit 313), but this is not limiting. For example, a storage apparatus storing therein the first compatibility information and a storage apparatus storing therein the second compatibility information may be provided separately.

Subsequently, the first transmitting unit 315 generates the application list screen 6 for providing the "application 1" that is identified by the application identification information indicating "001" and the "application 3" that is identified by the application identification information indicating "003", and transmits the generated application list screen 6 to the MFP 1 that is specified by the device specifying information (in this example, the device specifying information indicating "IJKL") included in the display request. The MFP 1 (the display controller 111) performs control of displaying the application list screen 6 received from the server 4 on the operation panel 27.

In the first modification, application compatibility information is formed of the first compatibility information and the second compatibility information so as to separate management of devices that belong to each group from management of applications available for the combination of the groups and the destination information. However, the application compatibility information is not limited to the example. The application compatibility information only needs to be information in which each combination of the device specifying information and the destination information is associated with the application identification information for identifying applications available for the combination, and any change can be made on the data configuration thereof.

The CPU (11 or 21) executes a computer program stored in a storage apparatus (for example, the ROM 12, the HDD 14, the ROM 22, and the flash memory 24) so as to implement functions of each unit (the display controller 111, the second transmitting unit 112, the receiving unit 113, and the controller 114) in the MFP 1 described in the embodiment, but this is not limiting. For example, at least a part of the functions of the units in the MFP 1 may be implemented by a dedicated hardware circuit (such as a semiconductor integrated circuit).

Second Modification of Embodiment

In the embodiment, the main body 10 and the operating unit 20 operate independently of one another on different OSes, but this is not limiting. For example, the main body 10 and the operating unit 20 may operate on the same OS. In other words, the main body 10 and the operating unit 20 may be integrated.

Figure 14:
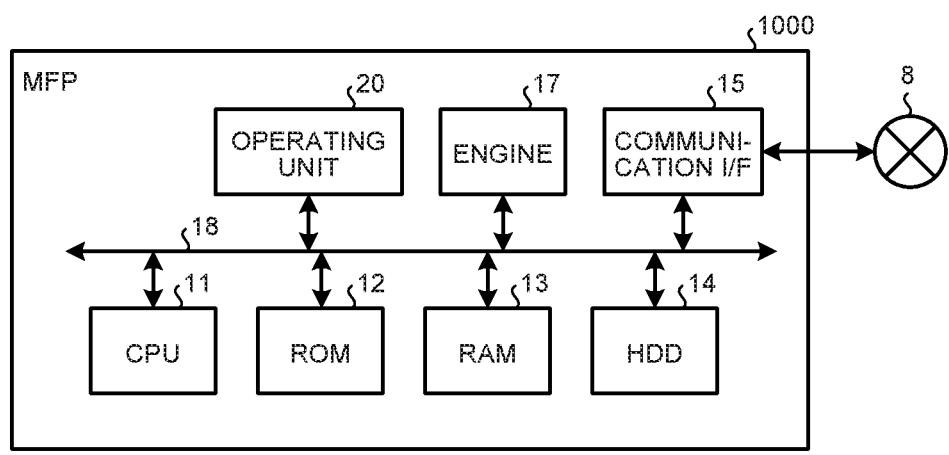
FIG. 14 is a diagram illustrating an example of a hardware configuration of an MFP according to a modification.

FIG. 14 is a diagram illustrating an example of a hardware configuration of an MFP 1000 according to the second modification. The MFP 1000 according to the second modification includes the CPU 11, the ROM 12, the RAM 13, the HDD 14, the communication I/F 15, the engine 17, and the operating unit 20, and these are connected to one another through the system bus 18.

The operating unit 20 according to the present embodiment is, for example, an LCD apparatus with a touch panel function, and has a touch panel function of receiving touch input. In the MFP 1 according to the present embodiment, the HDD 14 may be provided with the storage unit 313. In the MFP 1000 according to the second modification, the CPU 11 executes various kinds of computer programs stored in non-volatile recording media such as the ROM so as to implement functions of the display controller 111, the second transmitting unit 112, the receiving unit 113, and the controller 114 described with reference to the embodiment above.

Figure 15:
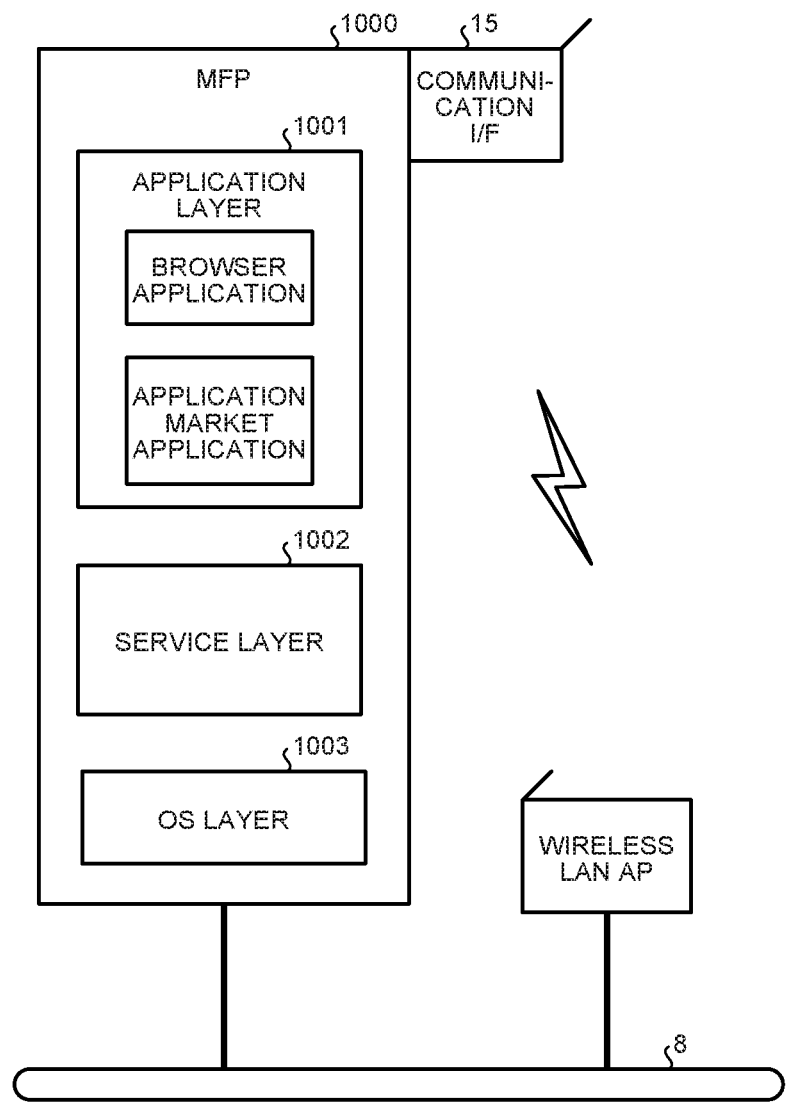
FIG. 15 is a diagram illustrating an example of a software configuration of the MFP according to the modification.

FIG. 15 is a schematic diagram illustrating an example of a software configuration of the MFP 1000 according to the second modification. The MFP 1000 according to the second modification includes an application layer 1001, a service layer 1002, and an OS layer 1003. Entities of the application layer 1001, the service layer 1002, and the OS layer 1003 are various kinds of software stored in the ROM 12, the HDD 14, and the like. The CPU 11 executes the software so as to provide various kinds of functions.

The application layer 1001 according to the second modification also includes software for causing the operating unit 20 to operate and providing a certain function. More specifically, the application layer 1001 includes software for providing UI functions for performing operations and display related to functions (a copy function, a scanner function, a facsimile function, and a printer function). In other words, the application layer 1001 according to the second modification includes the browser application 2b, the application market application 3, and the like.

The MFP 1000 according to the second modification has the above configuration so as to implement the same functions as those of the embodiment even when the main body 10 and the operating unit 20 are not independently provided unlike the embodiment.

The computer program executed by the information processing system 100 (the MFP 1 and the server 4) according to the embodiment is a file in an installable format or in an executable format, and may be recorded and provided in computer-readable recording media such as a compact disc read only memory (CD-ROM), a flexible disk (FD), a compact disc recordable (CD-R), a digital versatile disc (DVD), a universal serial bus (USB), and the like. The computer program may be provided or distributed through a network such as the Internet. Various kinds of computer programs may be preliminarily incorporated in a ROM and the like so as to be provided.

The present invention can provide applications according to function restrictions by countries or areas.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus connectable, through a network, to a server having a list of applications to be downloaded on the image forming apparatus, the image forming apparatus comprising:
at least one processor configured to,
execute a browser application to access a URL associated with the server,
transmit, to the server, a request that includes device specifying information uniquely identifying the image forming apparatus, language information indicating languages available for display on the image forming apparatus, group information indicating a group of image forming apparatuses associated with the image forming apparatus, the group including the image forming apparatus, and destination information indicating a country or an area where the image forming apparatus is used, the request requesting the list of applications to be downloaded onto the image forming apparatus,
receive, from the server as a response to the request via the browser application, list information of applications generated based on a combination of the device specifying information, the language information, the group information and the destination information and the type information included in the request, and the language information,
display a list screen representing the list of applications included in the received list information of applications,
download an application selected by a user from among the applications displayed on the list screen from an application server that stores a plurality of applications, and
install the downloaded application selected by the user onto a memory of the image forming apparatus.

2. The image forming apparatus according to claim 1, further comprising an icon for starting an application for displaying the list screen, and wherein the at least one processor is further configured to:
start the application for displaying the list of applications when the user taps the icon; and
transmit, to the server, the request requesting the list of applications to be downloaded on the image forming apparatus.

3. The image forming apparatus according to claim 2, wherein the list information of applications available to download further includes content description information related to the applications and terms of use information that indicates the terms of use of the applications.

4. The image forming apparatus according to claim 1, further comprising:
a main body including at least a printer or a scanner, a first processor, and a first operating system (OS); and
an operating unit that includes a second processor and a second OS and configured to perform control on the main body, wherein
the second processor is configured to display the list of applications by use of the browser application, the browser application operating under the second OS.

5. The image forming apparatus according to claim 1, wherein
the device specifying information is associated with group identification information identifying a group of image forming apparatuses being managed together, the group including the image forming apparatus; and
the list information of applications available is generated based on the group identification information.

6. The image forming apparatus according to claim 1, wherein
the request transmitted to the server further includes language information indicating languages available for display on the image forming apparatus; and
the list information of applications is generated based on a combination of the device specifying information, the destination information, and the language information included in the request.

7. The image forming apparatus according to claim 1, wherein
the list information of applications is a first list information; and
the list screen is a first list screen representing a first list of applications.

8. A system comprising:
an image forming apparatus; and
a server connectable to the image forming apparatus and storing a list of applications to be downloaded on the image forming apparatus, wherein
the image forming apparatus comprises,
at least one processor configured to,
execute a browser application to access a URL associated with the server,
transmit, to the server, a request that includes device specifying information uniquely identifying the image forming apparatus, language information indicating languages available for display on the image forming apparatus, group information indicating a group of image forming apparatuses associated with the image forming apparatus, the group including the image forming apparatus, and destination information indicating a country or an area where the image forming apparatus is used, the request requesting the list of applications to be downloaded onto the image forming apparatus, receive, from the server as a response to the request via the browser application, list information of applications generated based on a combination of the device specifying information, the language information, the group information and the destination information and the type information included in the request, and the language information, display a list screen representing the list of applications included in the received list information of applications, download an application selected by a user from among the applications displayed on the list screen from an application server that stores a plurality of applications, and install the downloaded application selected by the user onto a memory of the image forming apparatus.

9. The system according to claim 8, wherein the image forming apparatus further comprises an icon for starting an application for displaying the list screen; and the at least one processor is further configured to:

start the application for displaying the list of applications when the user taps the icon; and transmit, to the server, the request requesting the list of applications to be downloaded on the image forming apparatus.

10. The system according to claim 9, wherein the list information of applications available to download further includes content description information related to the applications and terms of use information that indicates the terms of use of the applications.

11. The system according to claim 8, wherein the image forming apparatus further comprises:

a main body including at least a printer or a scanner, a first processor, and a first operating system (OS); and an operating unit that includes a second processor and a second OS and configured to perform control on the main body, wherein the second processor is configured to display the list of applications by use of the browser application, the browser application operating under the second OS.

12. The system according to claim 8, wherein the device specifying information is associated with group identification information identifying a group of image forming apparatuses being managed together, the group including the image forming apparatus; and the list information of applications available is generated based on the group identification information.

13. An information processing method performed by an image forming apparatus, the information processing method comprising:

executing a browser application to access a URL associated with at least one server having a list of applications to be downloaded on the image forming apparatus;

transmitting, to the at least one server, a request that includes device specifying information uniquely identifying the image forming apparatus, language information indicating languages available for display on the image forming apparatus, group information indicating a group of image forming apparatuses associated with the image forming apparatus, the group including the image forming apparatus, and destination information indicating a country or an area where the image forming apparatus is used, the request requesting a list of applications to be downloaded onto the image forming apparatus;

receiving, from the at least one server as a response to the request via the browser application, list information of applications generated based on a combination of the device specifying information, the language information, the group information and the destination information included in the request, and the language information displaying a list screen representing the list of applications included in the received list information of applications;

downloading an application selected by a user from among the applications displayed on the list screen from an application server that stores a plurality of applications; and installing the downloaded application selected by the user onto a memory of the image forming apparatus.

14. The information processing method according to claim 13, wherein the image forming apparatus further includes an icon for starting an application for displaying the list screen, and the method further comprises:

starting the application for displaying the list of application when the user taps the icon; and transmitting, to the at least one server, the request requesting the list of applications to be downloaded on the image forming apparatus.

15. The information processing method according to claim 14, wherein the list information of applications available to download further includes content description information related to the applications and terms of use information that indicates the terms of use of the applications.

16. The information processing method according to claim 13, wherein the image forming apparatus further comprises:

a main body including at least a printer or a scanner, a first processor, and a first operating system (OS); and an operating unit that includes a second processor and a second OS and configured to perform control on the main body; and wherein the method further includes, displaying the list of applications by use of the browser application, the browser application operating under the second OS.

17. The information processing method according to claim 13, wherein the device specifying information is associated with group identification information identifying a group of image forming apparatuses being managed together, the group including the image forming apparatus; and the list information of applications available is generated based on the group identification information.

* * * * *